United States Patent
Steele et al.

(10) Patent No.: US 6,282,175 B1
(45) Date of Patent: Aug. 28, 2001

(54) METHOD FOR TRACKING CONFIGURATION CHANGES IN NETWORKS OF COMPUTER SYSTEMS THROUGH HISTORICAL MONITORING OF CONFIGURATION STATUS OF DEVICES ON THE NETWORK.

(75) Inventors: Douglas William Steele; Craig William Bryant, both of Ft. Collins; Todd M. Goin, Loveland; Thomas J. Moos, Windsor, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/065,263

(22) Filed: Apr. 23, 1998

(51) Int. Cl.[7] ................................ H04J 3/14; G06F 11/30
(52) U.S. Cl. ........................................... 370/254; 709/224
(58) Field of Search ................................ 370/254, 255, 370/256, 257, 258; 709/223, 224

(56) References Cited

U.S. PATENT DOCUMENTS

| | | | |
|---|---|---|---|
| 4,618,965 | * 10/1986 | Maxwell et al. | 375/10 |
| 5,734,824 | * 3/1998 | Choi | 395/200.11 |
| 5,793,362 | * 11/1998 | Mathews et al. | 395/200.54 |
| 5,926,463 | * 7/1999 | Ahearn et al. | 370/254 |
| 6,131,119 | * 10/2000 | Fukui | 709/224 |
| 6,188,973 | * 2/2001 | Martinez et al. | 702/188 |

* cited by examiner

*Primary Examiner*—Min Jung

(57) ABSTRACT

A tracking system that uses a revision control system and configuration status gathering to historically track and store configuration changes in computers and interconnect devices to aid in managing and troubleshooting networks of computer systems. Configuration data is gathered from devices on the network selected for monitoring on a periodic basis. The data collected each collection cycle is stored in a data storehouse on a computer within the network, called the remote support node. The data storehouse is comprised of a revision control system and data base. The data is accessed by computers on the network having web browsers. The user selects a first and second collection time, and any changes in configuration of any monitored devices in the network occurring between these two collection times is displayed in the browser window. By changing the collection times, configuration changes from different collection cycles may be viewed.

22 Claims, 10 Drawing Sheets

METHOD FOR TRACKING CONFIGURATION CHANGES IN NETWORKS OF COMPUTER SYSTEMS THROUGH HISTORICAL MONITORING OF CONFIGURATION STATUS OF DEVICES ON THE NETWORK.

FIELD OF THE INVENTION

This invention relates to computer systems and more particularly to managing and troubleshooting computer systems and other connected devices within networks. Even more particularly, the invention relates to managing and troubleshooting computer systems within networks by tracking configuration changes through historical monitoring of configuration status of devices on the network.

BACKGROUND OF THE INVENTION

Managing and troubleshooting computer system networks is a critical and essential task in most businesses, governmental entities, and educational institutions today. Several products have been developed to help assist the system administrator perform management and troubleshooting functions on computers and interconnect devices, such as routers, bridges, hubs, switches, etc., on the network. Some products are designed to help manage system configurations on a real time basis. Such products can tell the system administrator what the configurations of particular computers or devices are at the present moment. Some products may also enable the system administrator to make immediate changes to particular computers or devices or restore them to a previous state.

Other products can tell the system administrator what the current configuration of a computer or interconnect device is, but cannot tell the system administrator what the configuration was at a particular point in time in the past. Still other products may be able to tell the system administrator what the configuration was a week ago as compared to its current status, but cannot tell what the configuration was two weeks ago as compared to the configuration status of one week ago. Also, most products do not show the system administrator what has changed during the two time periods in question, but merely show the entire status of the computer or interconnect device at each time period. The system administrator must compare the two configurations to identify what has changed.

It is thus apparent that there is a need in the art for an improved method or apparatus which can provide system administrators management and troubleshooting functions that are not real time based. There is a need in the art for a method to identify what has changed within system configurations for computers or interconnect devices between two points in time in a quick and efficient manner and make those changes readily available to the system administrator for troubleshooting and managing purposes. The present invention meets these and other needs in the art.

SUMMARY OF THE INVENTION

It is an aspect of the present invention to track configuration changes in computer system devices on a network.

It is another aspect of the invention to use a revision control system to historically track configuration changes in computers and interconnect devices on a computer system network.

Yet another aspect of the invention is to save the configuration status of computers and interconnect devices at particular points in time within a revision control system.

Still another aspect of the invention is to identify what has changed in the configuration of computers and interconnect devices to aid in troubleshooting and managing a computer system network.

A further aspect of the invention is to display the configuration status of computers and interconnect devices at particular points in time in the past.

A still further aspect of the invention is to change the time frames for displaying configuration status of computers and interconnect devices.

Another aspect of the invention is to organize the configuration data collected into a logical hierarchy.

A still further aspect of the invention is to display configuration status data collected on computers and interconnect devices on a web browser.

The above and other aspects of the invention are accomplished in a tracking system that uses a revision control system and configuration information gathering to track and store configuration changes on a historical basis for computers and interconnect devices to aid in managing and troubleshooting networks of computer systems. The configuration data of monitored computers and interconnect devices on a network is gathered on a periodic basis and stored in a data storehouse within a separate computer, referred to as a remote support node, which is connected to the network. The data storehouse is made up of a data base and the revision control system. The configuration information may be displayed on a graphics display of the remote support node directly, but more typically is accessed through another computer, having a web browser, that accesses the remote support node over the network.

For monitored computers, the method collects, among other things, configuration information about the operating system, file system, printing and spooling, boot and shutdown, hardware, software, and network configurations. For monitored interconnect devices the method collects, among other things, configuration information about interfaces, IP addresses, routes, static routes, TCP ports, UDP ports, SNMP variables, human and machine readable configuration files, and installed cards.

Collector software residing on the remote support node gathers configuration data from monitored client computers and interconnect devices on the network. Each configuration item collected from computers and network interconnect devices is specified by a data collection template built into the tracking system. Different templates are available for various computer types and interconnect devices, and each template determines what configuration items can be collected from each particular type of device.

All client computers being monitored require special resident software, referred to as client collector software, to help facilitate the secure collection of configuration information. For monitored interconnect devices, no additional software is required, other than the standard SNMP (Simple Network Management Protocol), Telnet (remote login virtual terminal protocol), and TFTP (Trivial File Transfer Protocol) facilities already available within the interconnect devices. The collector examines the interconnect device type and the requested configuration item to be collected to determine which of these communications methods, or which combination of them, is most appropriate. However, monitored interconnect devices must grant access to the collection process. Granting this access usually involves making a configuration change to the monitored interconnect device to enable collection.

The collector software collects configuration items at preset collection cycles, normally once a day, by predefining an initial collection time and a frequency, usually daily. Each time a collection occurs, the data base is updated to start the next collection at the last collection time plus the frequency.

At each collection cycle, a snapshot is constructed for each configuration item for each monitored computer or interconnect device, and, if a change has occurred, the changes are stored in the data storehouse. The configuration item may be a text file or the output of a command which displays configuration information in ASCII format. A snapshot is a unit of configuration data as it appears when collected from a monitored device. The actual data collected is stored in the revision control system, while the data base contains information about what has changed and the logical hierarchy of the systems being monitored.

When accessing the stored information through a web browser, the graphics display is split into two frames. The information's logical hierarchy is displayed in a tree format in one of the frames. The changes found between snapshots taken on different collection cycles are displayed in the other frame. Different configuration data may be displayed by changing the collection cycles selected for comparison. Configuration items which have changed between the two collection cycles selected are indicated by a marker placed on the icon of the item in the tree. If the changed configuration item is in a group in the tree that has not been opened, the marker is propagated up the tree and displayed on the group icon. This notifies the user that at some level below this group icon, a change has occurred in a configuration item. By opening up as many groups and/or subgroups in the tree as are necessary, the user can eventually display the individual item or items that have changed that have the marker.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
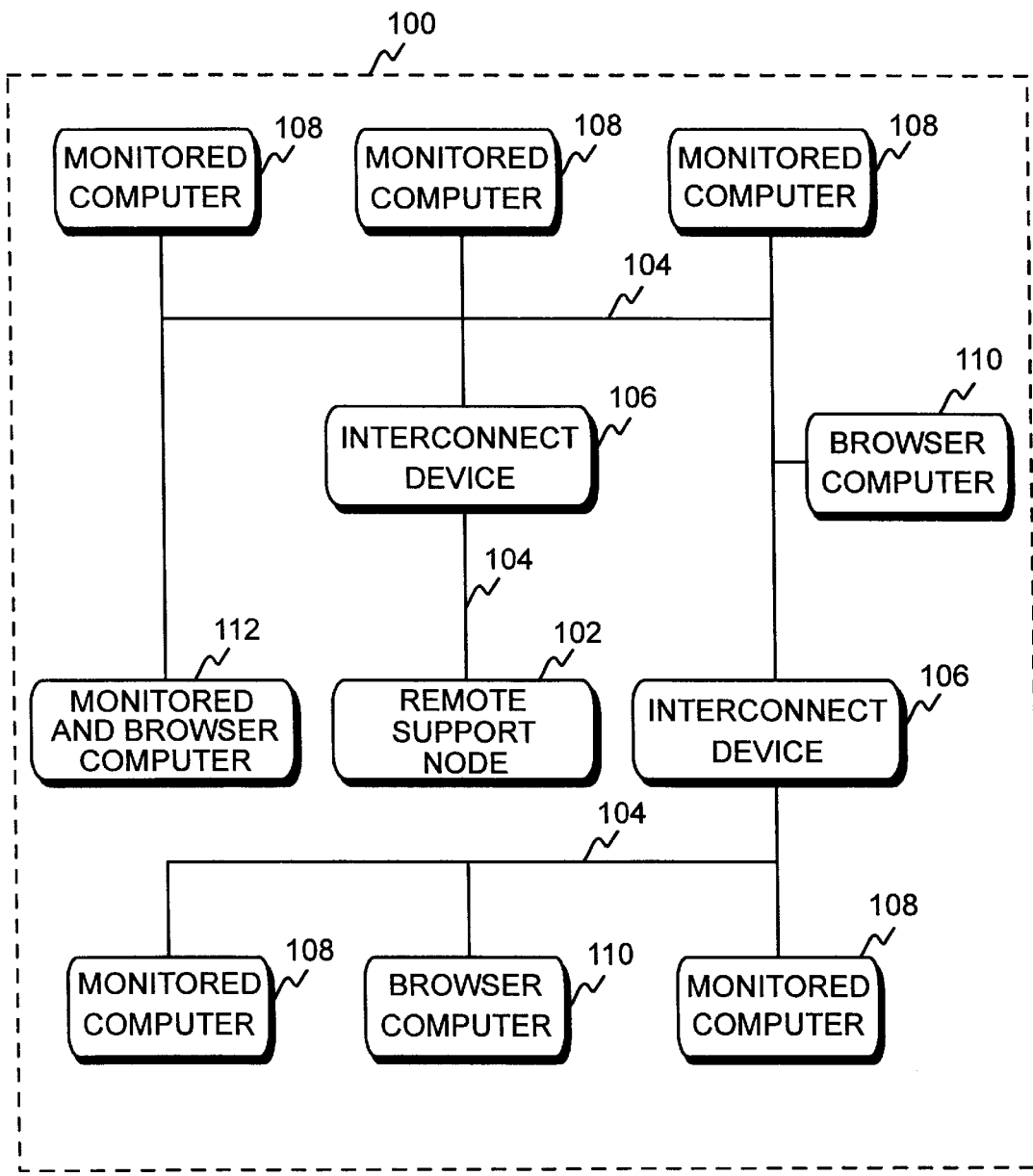
FIG. 1 shows a block diagram of a networked system of computers and interconnect devices incorporating the tracking system of the present invention.

FIG. 1 shows a block diagram of a networked system of computers and interconnect devices incorporating the tracking system of the present invention. Referring now to FIG. 1, computer system network 100 has a remote support node 102 connected to the other components of computer system network 100 through network connections 104. Computer system network 100 also has interconnect devices 106, which may be routers, bridges, hubs, switches, etc., also connected through network connections 104 to remote support node 102. Computer system network 100 may have more or less than the number of interconnect devices 106 shown in FIG. 1.

Computer system network 100 also has monitored computers 108 connected through network connections 104 to remote support node 102. Computer system network 100 may have more or less than the number of monitored computers 108 shown in FIG. 1. Browser computers 110 access remote support node 102 through network connections 104 in order to view configuration data stored on remote support node 102. There may be more or less than the number of browser computers 110 on computer system network 100 shown in FIG. 1. Monitored and browser computer 112 is monitored by remote support node 102 through network connections 104. Monitored and browser computer 112 can also access remote support node 102 through network connections 104 in order to view configuration data stored on remote support node 102. There may be more or less than the number of monitored and browser computers 112 on computer system network 100 shown in FIG. 1.

Figure 2:
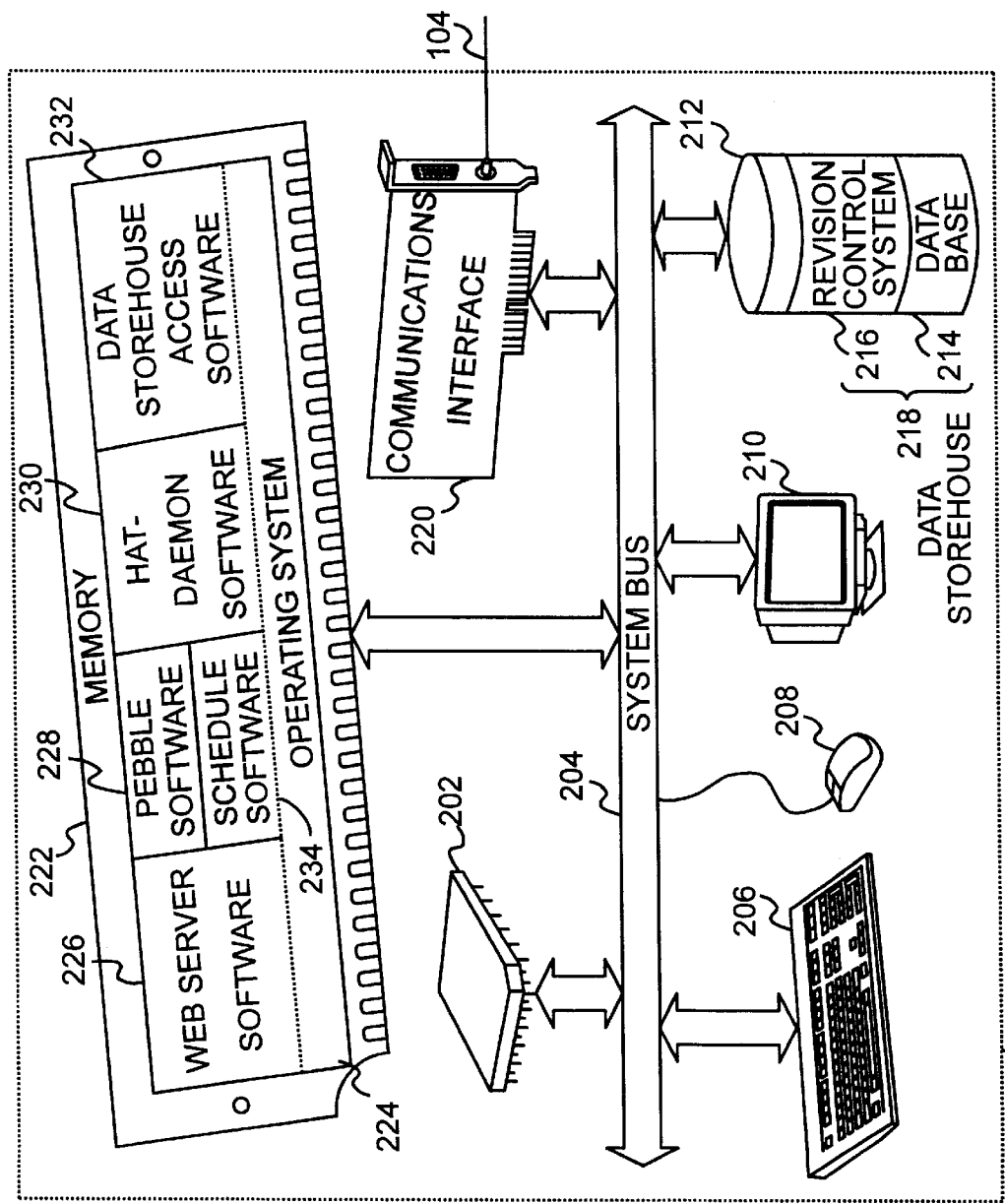
FIG. 2 shows a block diagram of a remote support node of the tracking system of the present invention.

FIG. 2 shows a block diagram of remote support node 102 (FIG. 1) of the tracking system of the present invention. Referring now to FIG. 2, remote support node 102 contains a processing element 202. Processing element 202 communicates to other elements of remote support node 102 over a system bus 204. A keyboard 206 allows a user to input information into remote support node 102 and a graphics display 210 allows remote support node 102 to output information to the user. A mouse 208 is also used to input information.

Storage device 212 is used to store data and programs within remote support node 102. Within storage device 212 is data storehouse 218, which has two components: data base 214 and revision control system 216. Communications interface 220, also connected to system bus 204, receives information from network connection 104. A memory 222, also attached to system bus 204, contains an operating system 224, web server software 226, pebble software 228, hat daemon software 230, data storehouse access software 232, and schedule software 234 that are called up from storage device 212.

A browser computer 110 (FIG. 1) requests a page (html file) of the tracking system of the present invention from remote support node 102. The request is handled by web server software 226, which invokes pebble software 228. Pebble software 228 is made up of Common Gateway Interface (CGI) scripts. The CGI script passes a token to hat daemon software 230 to get permission to run. If permission to run is given, then the CGI script accesses data storehouse 218 through data storehouse access software 232, which may be the access software for data base 214, or the access software for revision control system 216, or both. The data accessed from data storehouse 218 is passed back to web server software 226, which passes it on to browser computer 110 for display in the browser frames. Schedule software 234 is explained in FIG. 6.

Figure 3:
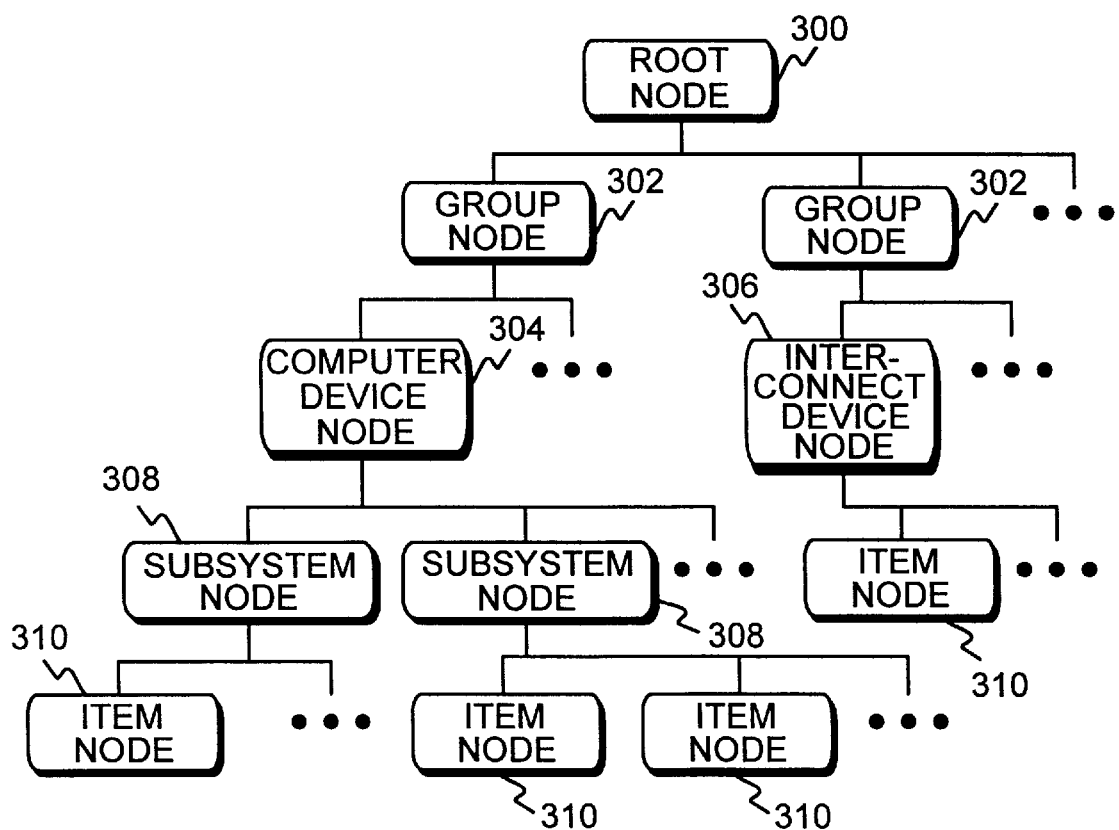
FIG. 3 shows a block diagram of the hierarchy for storing data of the tracking system of the present invention.

FIG. 3 shows a block diagram of the hierarchy for storing data of the tracking system of the present invention. The configuration data that is collected and stored in data storehouse 218 (FIG. 2) is structured by a view. This view imposes a hierarchical organization on the configuration data collected from the monitored devices of the networked systems. Although the view corresponds closely to how the data is structured in the user interface, it should not be thought of as the display.

Referring now to FIG. 3, at the top of the hierarchy is root node 300, which is normally an entity name or a division name of an entity utilizing the tracking system. Examples might be "Acme Company" or "Production Division of Acme Company". Beneath root node 300, group nodes 302 are organized to track computers and interconnect devices in groups. Typical examples might be "accounting group", "manufacturing group", and "research and development group". Computer device nodes 304 list all the computers contained under group nodes 302. Interconnect device nodes 306 list all the interconnect devices contained under group nodes 302. Computer device nodes 304 may be further broken down into subsystem nodes 308. A subsystem node may represent a group of software within the computer, such as "operating system", "accounting system", etc.

At the bottom of the hierarchy are item nodes 310, which are leaf level nodes representing the individually collected configuration data. Item nodes 310 are children of subsystem nodes 308 and interconnect device nodes 306. Item nodes 310 may also be direct children of computer device nodes 304 in the absence of a subsystem node 308. Additional group nodes, device nodes, subsystem nodes, and item nodes not shown in FIG. 3 are depicted with the " . . . " notation.

Figure 4:
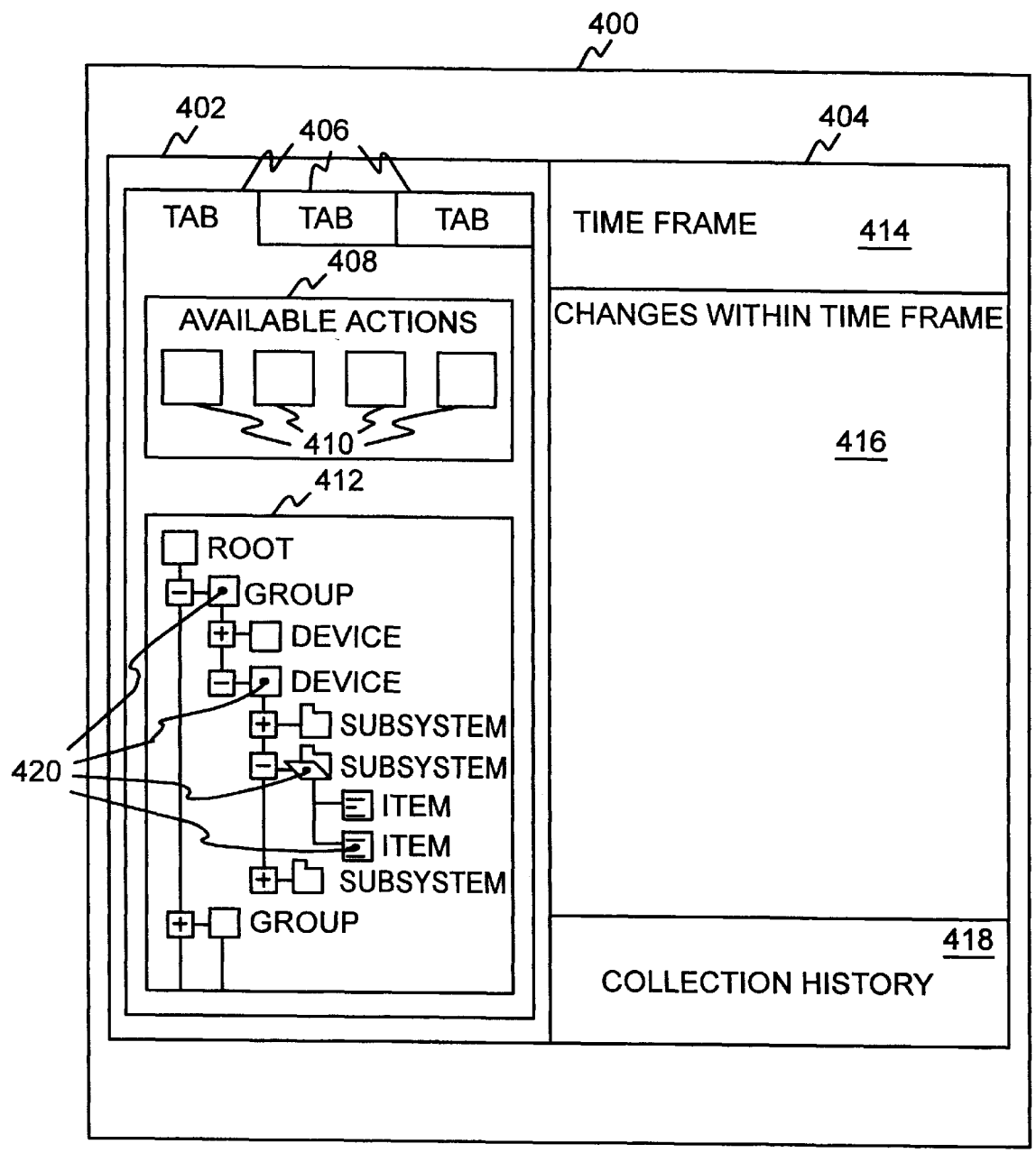
FIG. 4 shows a representation of a screen capture of a web browser accessing the stored data of the tracking system of the present invention.

FIG. 4 shows a representation of a screen capture of a browser computer 110 or a monitored and browser computer 112 accessing the stored data in the tracking system of the present invention. Referring now to FIG. 4, screen display 400 of browser computer 110 or monitored and browser computer 112 (FIG. 1) has loaded up web browser software and has requested the URL (Universal Resource Locator) of the tracking system of the present invention. Remote support node 102 (FIG. 1) has returned the html page requested for display on screen display 400. Screen display 400 is divided into two frames: tracking tree frame 402 and data display frame 404. Tabs 406 may be selected in tracking tree frame 402 to access the different functionality of the tracking system. Selecting an administration tab gives the user access to the administrative functions of the present invention to set up the tracking system. Users and user accounts may be added or deleted; computers and interconnect devices may be added or deleted; groups may be added or deleted; the collection schedule may be set or changed; and individual items may be enabled or disabled from collection. Selecting a log tab allows the user to access the logging functions of the present invention to view log entries of collection activities, errors, and alarms.

Selecting a tracking tab, as shown in FIG. 4, gives the user access to the present inventions tracking functions. Selecting the tracking tab gives the user access to tracking tree 412 and available actions 408. By selecting buttons 410 within available actions 408, the user can alter how the stored data is displayed. For example, by selecting different buttons 410, the user can change the collection cycles selected for which tracking tree 412 displays configuration information; show configuration status for a particular collection cycle; show only the changes in configuration status between two particular collection cycles; update the display to reflect current configuration information; or access help files.

Buttons 410 allow the user to select the beginning and ending collection cycles for displaying changes in configuration information. These two collection cycles selected define the range over which observed configuration changes are reported. An observed change is a difference between the two snapshots of the configuration item as captured on the two collection cycles selected. The tracking system takes the difference between the two snapshots, if any, calls the difference out for the user, and the difference itself is viewable through the web browser user interface. This difference analysis has intelligence in that inconsequential or expected changes, such as dates in command outputs, will be ignored and not flagged as differences. Differences in configuration items that are normally always changing are ignored.

Tracking tree 412 is an expandable index of configuration items being tracked for each monitored device and is constructed from the data in data base 214. This is done so that when a user logs in to the tracking system and it becomes time to populate tracking tree 412, it will happen very quickly. When a user views tracking tree 412 and selects a data item that has changed, revision control system 216 supplies the data regarding the changes that were made in that data item and displays those changes in data display frame 404. Tracking tree 412 utilizes the data hierarchy of FIG. 3 to display configuration information. To view information about groups, devices, and individual configuration items, also referred to as data items, the user may click on the [+] symbols to expand the tree and then select the name of the item of interest.

As a way of indicating to the user that a change has occurred in a configuration item, change indicators 420 are placed on or next to each icon in the tree in the chain starting with the group node level down to where the change has occurred at the item node level. Change indicators 420 may be a mark of any kind or of any color. In the preferred embodiment of the invention, a blue change indicator 420 represents a change, a yellow change indicator 420 represents a collection failure, and a brown change indicator 420 represents that the configuration item was disabled from collection. If a change has occurred in a configuration item from comparing the two collection cycles selected, and only the group nodes are displayed when tracking tree frame 402 is displayed, a change indicator 420 will be on or next to its group node icon. Clicking on the [+] symbol for the group node icon will expand the tree to list all the devices under that group node. The device in which change has occurred will have a change indicator 420 on or next to its device icon. Clicking on the [+] symbol for the device icon will expand the tree to list all the subsystems, if any, under that device node. The subsystem, if any, in which change has occurred will have a change indicator 420 on or next to its subsystem icon. Clicking on the [+] symbol for the subsystem icon will expand the tree to list all the data items under that subsystem node. The data item in which change has occurred will have a change indicator 420 on or next to its data item icon.

Selecting a device name in tracking tree 412 displays the name of the data collection template assigned to the device. Selecting individual configuration item names displays information about the item. Right clicking on any name, icon, or symbol in tracking tree 412 accesses a pop-up menu which provides access to appropriate actions. Selecting a Properties option from the pop-up menu displays information about the item selected. Time frame 414 displays the dates of the two collection cycles selected for displayed changes. Changes within time frame 416 displays the changes found in data items between the two collection cycles shown in time frame 414. Collection history 418 displays the date and time that the data item in question changed.

Figure 5:
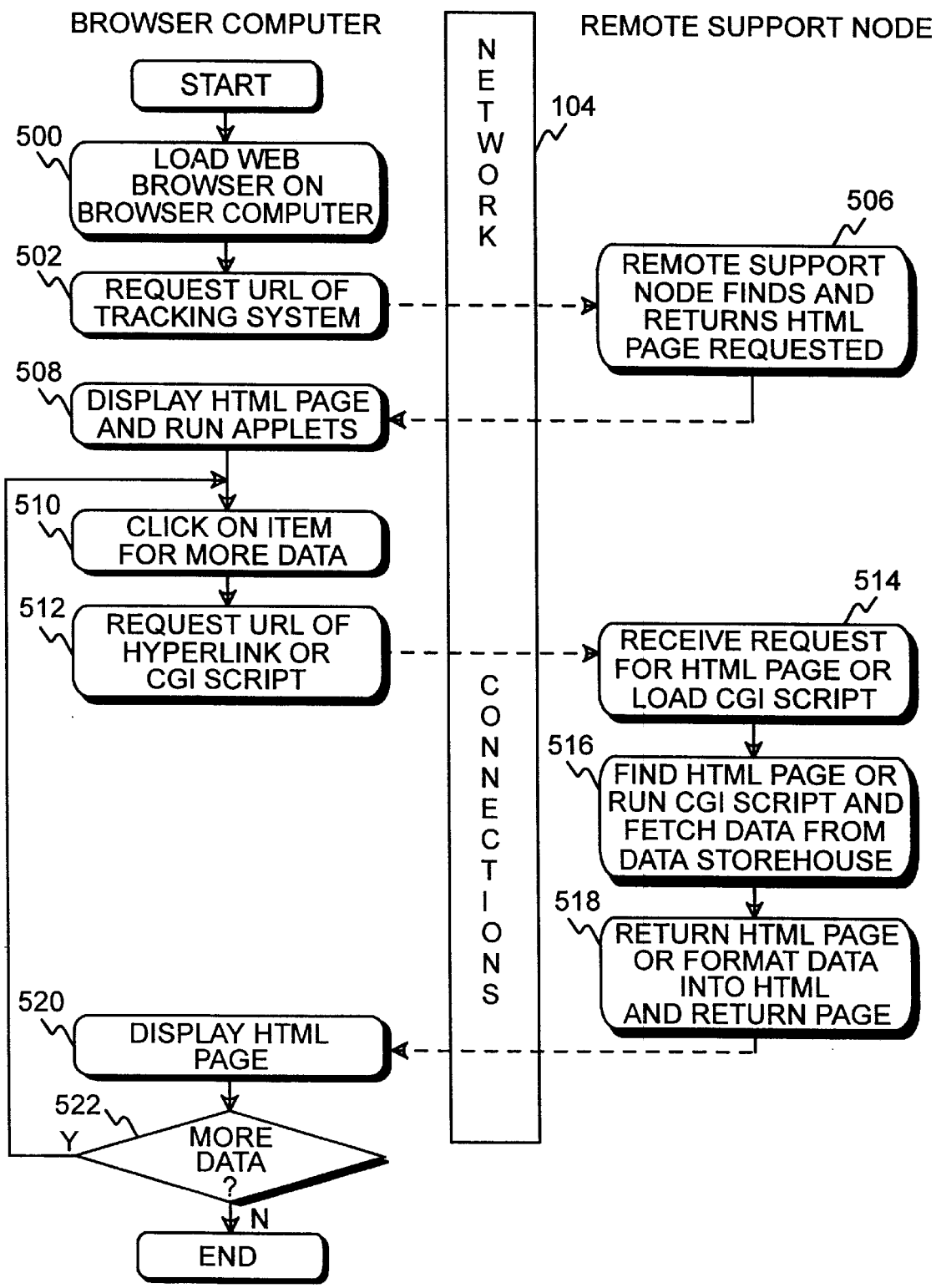
FIG. 5 shows a flow diagram of displaying stored configuration information located in a remote support node on a browser computer having a web browser.

FIG. 5 shows a flow diagram of displaying stored configuration information located in a remote support node on a browser computer having web browser software. Referring now to FIG. 5, in block 500 web browser software is loaded on browser computer 110 (FIG. 1). In block 502, a user requests the URL of the tracking system of the present invention. The web browser software establishes a connection through network connections 104 (FIG. 1) to remote support node 102 (FIG. 1). In block 506, remote support node 102 finds and returns to browser computer 110 through network connections 104 the html page requested in block 502.

In block 508, the html page received from block 506 is displayed in screen display 400 (FIG. 4) on browser computer 110. The screen display is divided into tracking tree frame 402 (FIG. 4) and data display frame 404 (FIG. 4). Tracking tree frame 402 contains applets, which are programs written in a programming language supported by the Web browser. Some applets associated with the html page run automatically when the html page is received and control what is displayed within tracking tree frame 402.

The user may choose to receive more data in block 510 by clicking on any of several hyperlinks that may be displayed in screen display 400. Additionally, certain buttons, tabs, and data item names, which act like hyperlinks but are really applets, may be clicked on in tracking tree frame 402 to receive more data. Tabs 406, available actions buttons 410, and selecting data item names in tracking tree 412 (FIG. 4) are examples of such applets. After clicking on one of these hyperlinks or applet controlled items, in block 512 browser computer 110 requests the URL associated with the hyperlink, or initiates the applet controlled item. The applet controlled items are typically requests for Common Gateway Interface (CGI) scripts. The request for the URL or the CGI script is sent through network connections 104 and received by remote support node 102 in block 514, where the request for the html page is received, or the requested CGI script is loaded. In block 516 remote support node 102 finds the html page, or the CGI script communicates with hat daemon software 230 (FIG. 2) to get permission to run, if required. If permission is granted or not required, the CGI script runs, fetching data from data storehouse 218 (FIG. 2). In block 518 the html page is returned, or the data fetched from data storehouse 218 is formatted into html format, and then returned through network connections 104 to browser computer 110 for display on screen display 400.

In block 520 the html page from either the requested URL or CGI script is normally displayed in data display frame 404, displaying the data requested by the user. In some cases, the CGI script that was run may not return any data for display in data display frame 404. Instead, a message of some kind may be posted to tracking tree frame 402.

If more hyperlinks or applet controlled items are to be requested by the user, then in block 522 control returns to block 510 where the user may click on a next hyperlink or applet controlled item. If the answer in block 522 is no, then the program ends, leaving the current html page displayed. The user may then select other URL addresses unrelated to the tracking system, or close the web browser software and load other programs.

Figure 6:
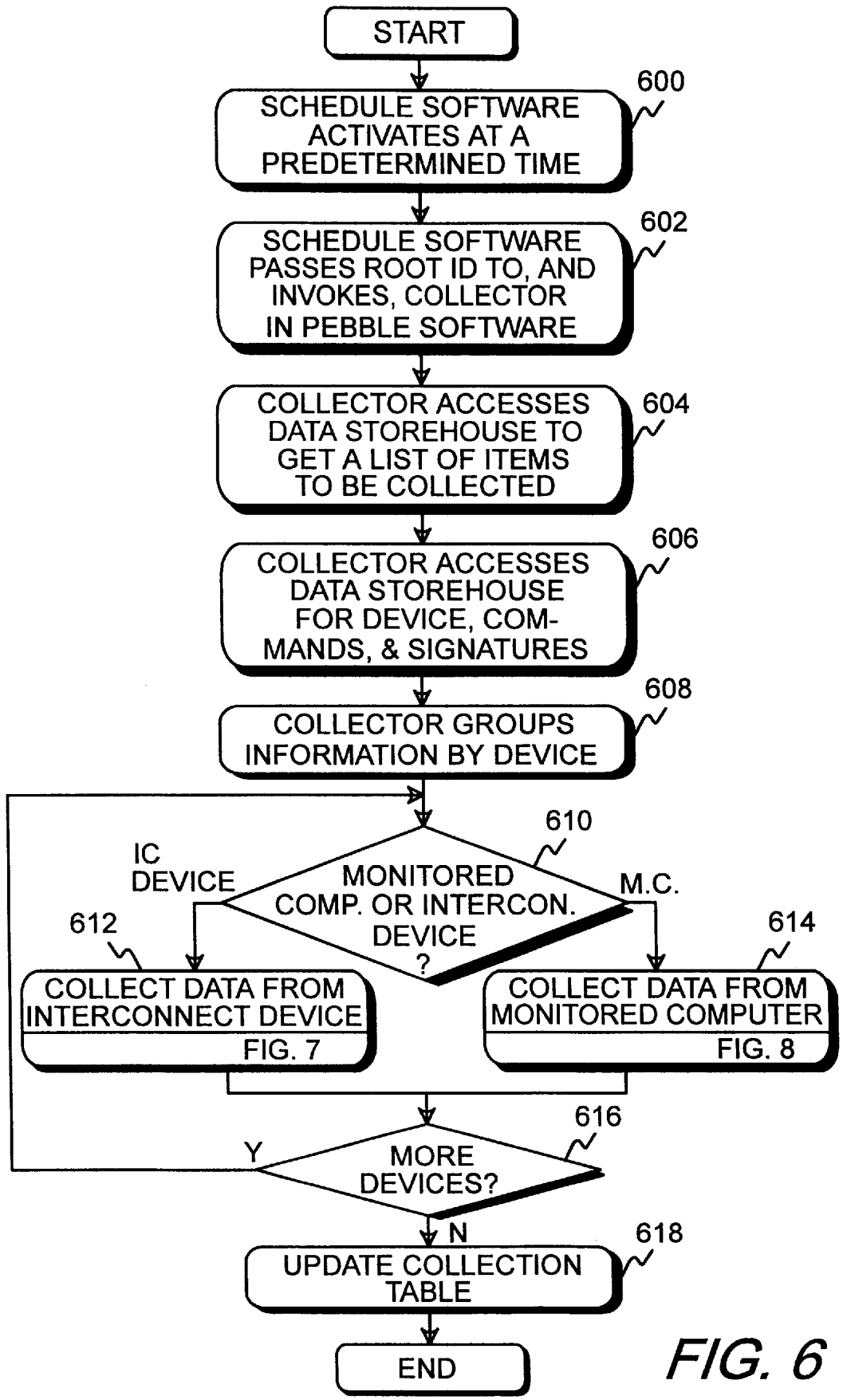
FIG. 6 shows a flow diagram of a remote support node collecting configuration data from computers and interconnect devices.

FIG. 6 shows a flow diagram of a remote support node collecting configuration data from computers and interconnect devices. Referring now to FIG. 6, in block 600 schedule software 234 (FIG. 2) activates at a predetermined time. Usually, the user will set the activation time to occur once a day when there is low activity anticipated on the network, such as late at night or early in the morning. However, the user may initiate a collection at any time that a scheduled collection is not already in progress. Collections, both scheduled and user initiated, may also be limited in scope to specific groups or devices as opposed to the entire enterprise.

In block 602, schedule software 234 passes a collection root identifier to a portion of pebble software 228 (FIG. 2) and invokes that portion of pebble software 228. That portion of pebble software 228 that receives the collection root identifier and is invoked by schedule software 234 is referred to as collector. The collection root identifier determines the scope of the collection to be performed.

In block 604 collector then accesses data storehouse 218 (FIG. 2) and requests the list of items to be collected that fall within the scope of the passed in collection root identifier. The list is comprised of Globally Unique Identifiers (GUIDs, or simply "identifiers"). Each identifier in the list is associated with a unique configuration item to be collected from the various monitored devices that are included within the scope of the collection root identifier. Each configuration item is a unit of data that is collected and monitored by the tracking system, which provides a mapping between the name of a configuration item and the identifier. This data could be a text file or the output of a command which displays configuration information in ASCII format. Along with the configuration data itself, collector will also collect any attributes of the data specified in the data collection template that are useful to the user. Not all configuration data has useful attributes, so not all configuration data items will have attributes associated with them. The attributes that are collected will be displayed to the user.

A unit of configuration data as it appears when collected from a monitored device is called a snapshot. If a snapshot has changed from the previously collected version of that snapshot, the differences will be stored in data storehouse 218 on remote support node 102. The set of all snapshots of a configuration item which have been collected and stored in data storehouse 218 is called a configuration storable.

After collector in block 604 has received the list of identifiers, then collector in block 606 accesses data storehouse 218 and gathers collection method information from data storehouse 218 on each of the identifiers in the list, such as what devices should specific data items be collected from, what commands are to be used for collecting specific data items, and the signature of the last collection of a specific data item. The signature may be, for example, a checksum of the previous output, or a last known modified date. Prior to the first collection, the signature for a data item has no value.

In block 608, collector then groups the information gathered in block 606 by device. Block 610 then determines if the first device in the list is a monitored computer or interconnect device. If the first device is a monitored interconnect device, then control passes to block 612, which calls FIG. 7 to perform the data collection process on the monitored interconnect device. If the first device in block 610 is a monitored computer, then control passes to block 614, which calls FIG. 8 to perform the data collection process on the monitored computer.

Figure 7:
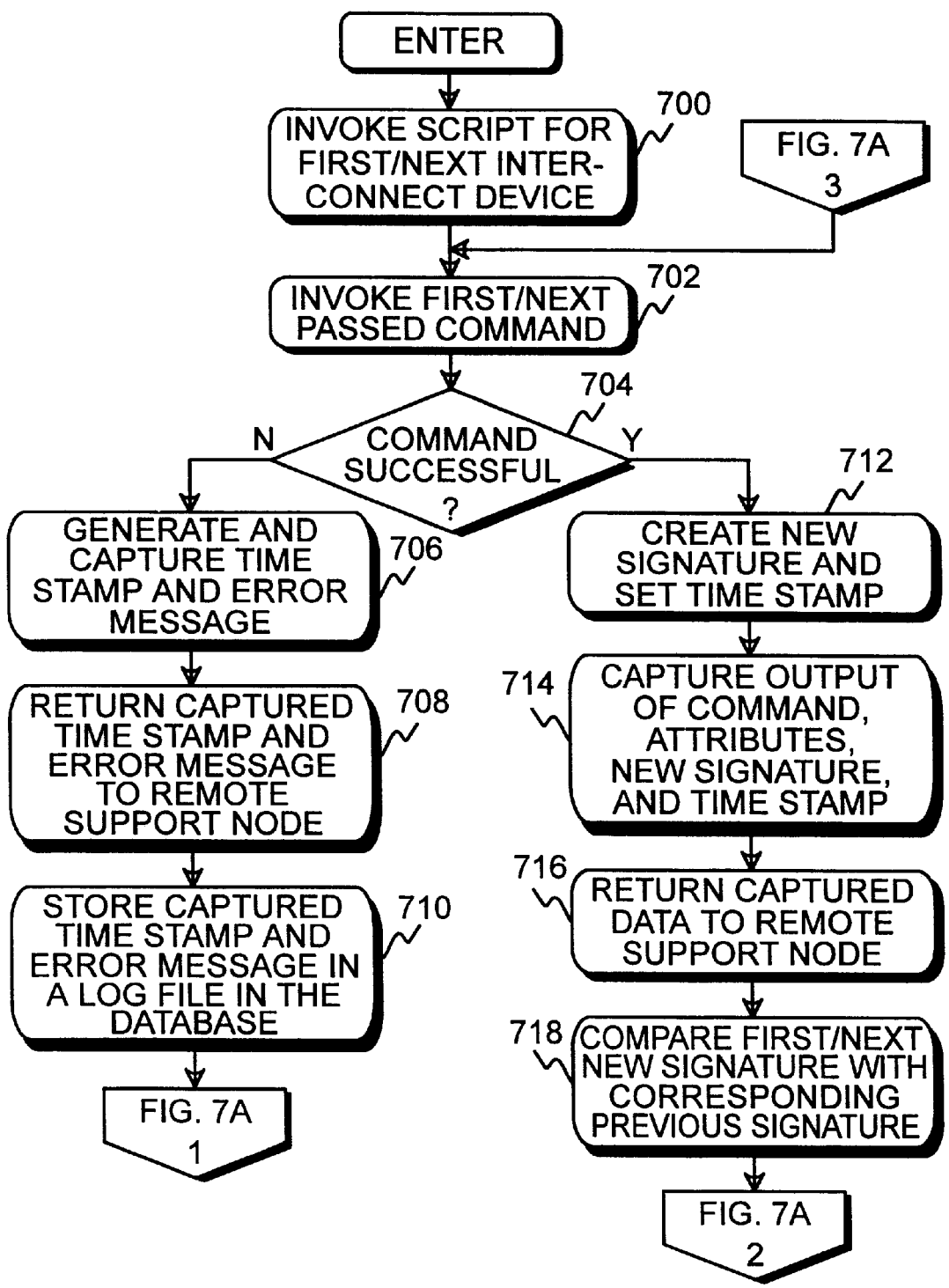
FIGS. 7 and 7A show a flow diagram of configuration data collection from an interconnect device.
Figure 8:
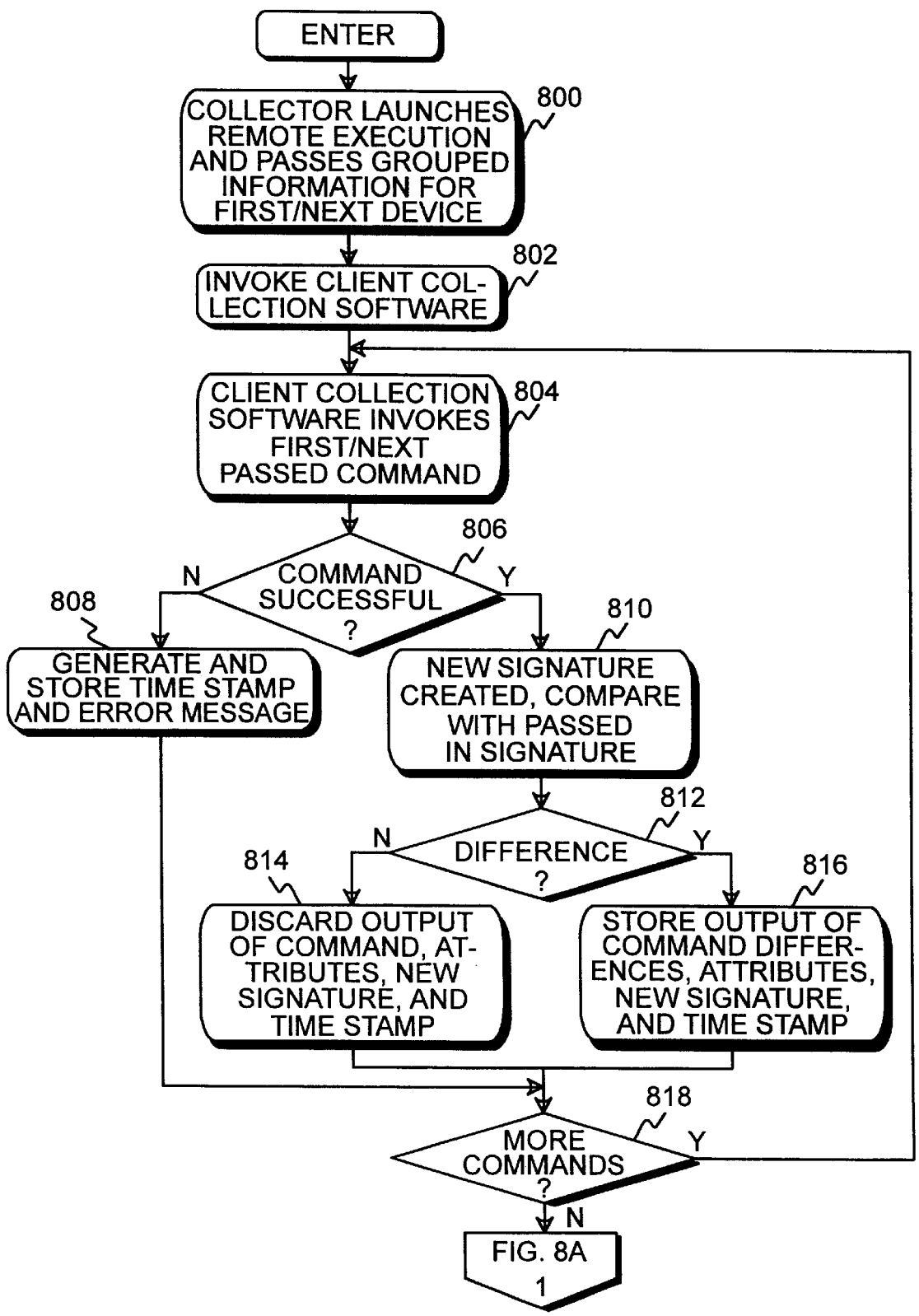
FIGS. 8 and 8A show a flow diagram of configuration data collection from a monitored computer.

Upon returning from either FIG. 7 or FIG. 8, block 616 determines if the collection process is to be performed on any more devices. If the answer is yes, control passes to block 610 which determines if the next device in the list is a monitored computer or interconnect device. If the answer in block 616 is no, then control passes to block 618, which updates the collection tables in remote support node 102, and then the process ends. The collection tables store information regarding the collection, such as the time and date of the collection, the scope of the collection, whether there were any changes in the collection as compared to the previous collection, and if there were any failures.

Figure 7A:
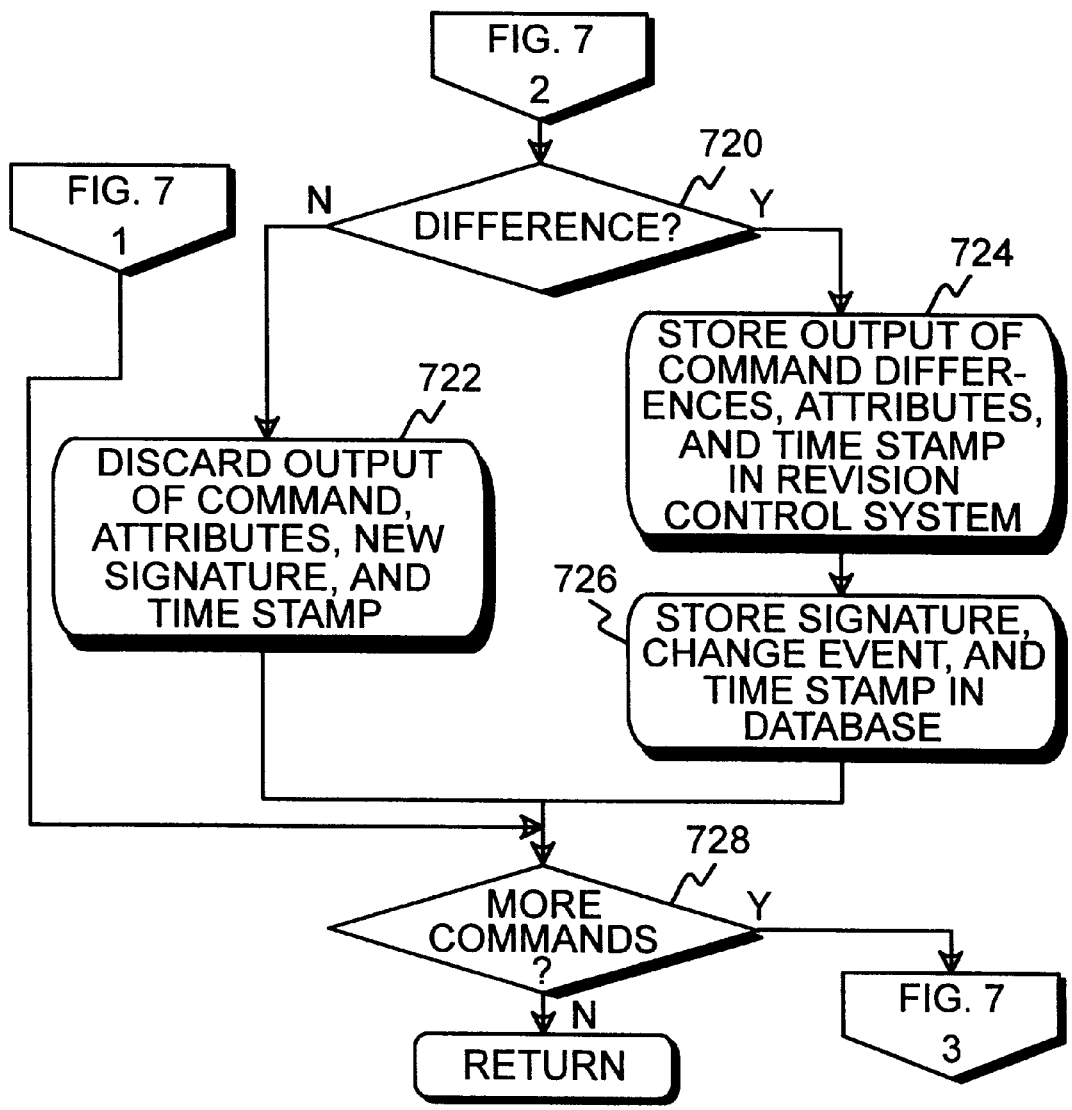

FIGS. 7 and 7A show a flow diagram of configuration data collection from a monitored interconnect device. Referring now to FIGS. 7 and 7A, in block 700 collector invokes a collection script within remote support node 102 associated with the first type of monitored interconnect device 106 (FIG. 1). In block 702 the collection script invokes the first collection command.

Block 704 determines if the command to collect a configuration item was run successfully. There may be a time limit imposed on running the command, or a set number of tries allowed, or both. If the collection command was not run successfully, then in block 706 a time stamp is set and an error message is generated, and both are captured. Block 708 returns the time stamp and the error message to remote support node 102. Block 710 stores the time stamp and error message in a log file in data base 214 within data storehouse 218 (FIG. 2). The data is stored in ASCII format. Control then passes to block 728.

If the collection command was run successfully in block 704, then in block 712 a new signature is created and a time stamp is set. Block 714 then captures the output of the command, any attributes associated with the configuration data to be collected, the new signature, and the time stamp. Block 716 returns this captured data to remote support node 102 and stores it in memory 222. Block 718 compares the new signature for the configuration item from block 712 to the previously collected signature for that same configuration item. Block 720 determines if the two signatures compared in block 718 are the same or different. If there is no difference between the two signatures, then in block 722 the output of the command, any attributes, the new signature, and the time stamp are discarded. Control then passes to block 728.

If in block 720 the two signatures are determined to be different, then in block 724 the differences in the output of the command, any attributes, and the time stamp are stored in revision control system 216 within data storehouse 218 (FIG. 2). Block 726 then stores the new signature, the time stamp, and a change event indicator in data base 214 within data storehouse 218. All of the data is stored in ASCII format. Control then passes to block 728.

Block 728 determines if there are any more collection commands to be run in the group for this monitored interconnect device 106. If the answer is yes, control passes to block 702 where the next command is invoked. If the answer in block 728 is no, then control returns to FIG. 6.

Figure 8A:
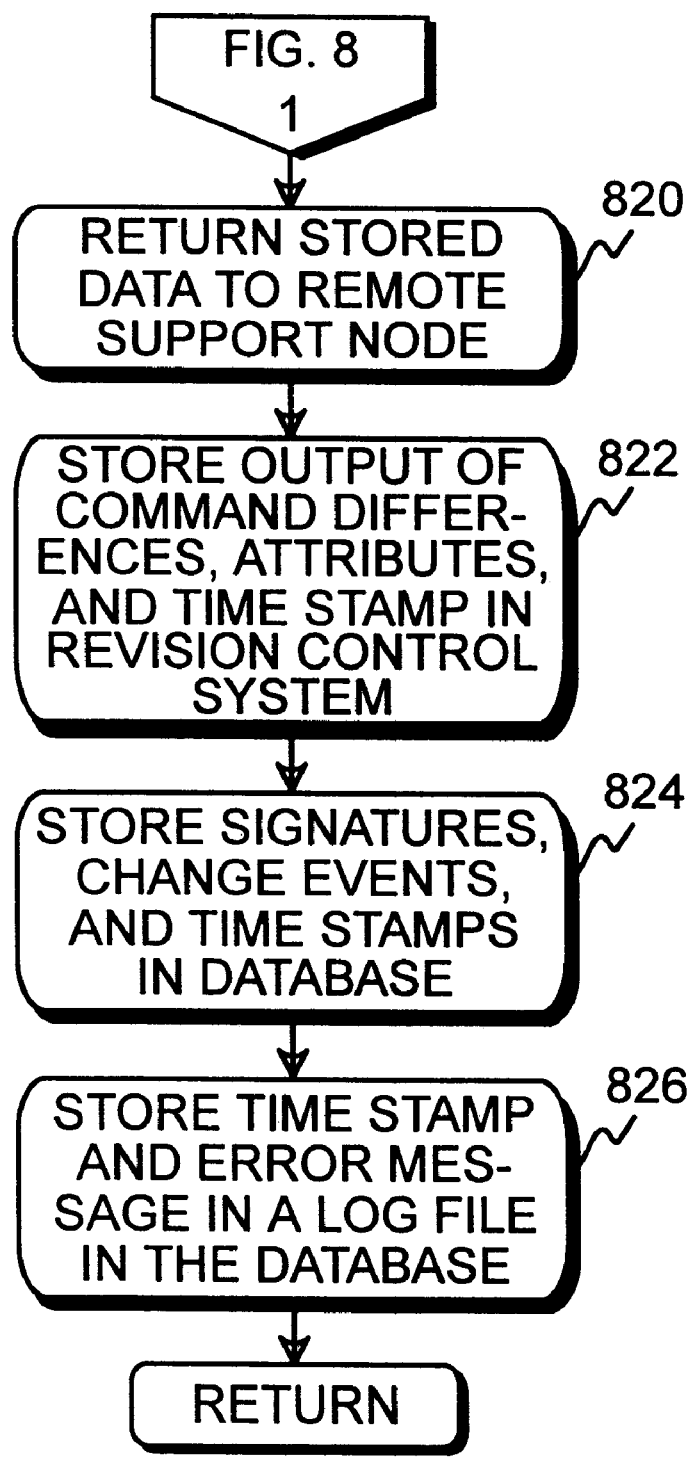

FIGS. 8 and 8A show a flow diagram of configuration data collection from a monitored computer. Referring now to FIGS. 8 and 8A, in block 800, collector launches a remote execution of the collection process through a DCE (Data Communication Exchange) RPC (Remote Procedure Call) procedure by passing the group of information for the first monitored computer to the first monitored computer. In block 802 collector invokes the client collection software that has been previously installed on monitored computer 108. In block 804, the client collection software invokes the first passed in collection command.

Block 806 determines if the command to collect a configuration item was run successfully. There may be a time limit imposed on running the command, or a set number of tries allowed, or both. If the collection command was not run successfully, then in block 808 the client collection software sets a time stamp and generates an error message, and both are stored in a memory in monitored computer 108 (FIG. 1). The data is stored in ASCII format. Control then passes to block 818.

If the collection command was run successfully in block 806, then in block 810 the client collection software creates a new signature for the configuration item and compares this new signature to the previously collected signature that was passed in block 800. Block 812 determines if the two signatures compared in block 810 are the same or different. If there is no difference between the two signatures, then in block 814 the output of the command, any attributes, the new signature, and the time stamp are discarded. Control then passes to block 818.

If in block 812 the two signatures are determined to be different, then in block 816 the differences in the output of the command, any attributes, and the time stamp are stored in memory within the monitored computer. Control then passes to block 818.

Block 818 determines if there are any more collection commands to be run in the group for this monitored computer 108. If the answer is yes, control passes to block 804 where the client collection software invokes the next passed in command. If the answer in block 818 is no, then control passes to block 820.

In block 820 the stored data from blocks 808 and 816 is returned to remote support node 102 (FIG. 1). In block 822 the differences in the output of the command, any attributes, and the time stamp for each collection command having a difference are stored in revision control system 216 within data storehouse 218 (FIG. 2). Block 824 then stores the new signature, the time stamp, and a change event indicator for each collection command having a difference in data base 214 within data storehouse 218. Block 826 stores the time stamp and error message for each collection command that failed in log file in data base 214 within data storehouse 218 (FIG. 2). All of the data is stored in ASCII format. Control then returns to FIG. 6.

One skilled in the art will recognize that if a command failed, the time stamp and error message could immediately be sent to remote support node 102 for storage. Likewise, if the command was successful and there was a difference between the new signature compared to the previous signature, the data to be stored could immediately be sent to remote support node 102 for storage.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A computerized method for tracking configuration changes within a computer system comprising the steps of:
   (a) collecting a first snapshot of a data item having a unique identifier at a first predetermined time, from a first monitored device on a computer system network, and setting a first time stamp indicating when said first snapshot was collected;
   (b) storing said first snapshot of said data item and said first time stamp in a remote support node connected to said first monitored device through a first network connection within said computer system network;
   (c) collecting a second snapshot of said data item having said unique identifier at a second predetermined time, from said first monitored device on said computer system network, and setting a second time stamp indicating when said second snapshot was collected;
   (d) comparing said stored first snapshot of said data item to said collected second snapshot of said data item;
   (e) when step (d) determines that said collected second snapshot of said data item has at least one difference from said stored first snapshot of said data item, performing step (f) and not step (g), and when step (d) determines that there is no difference, performing step (g) and not step (f);
   (f) storing all differences identified in step (d) and said second time stamp in said remote support node as a most recently stored snapshot of said data item;
   (g) discarding said second snapshot and said second time stamp, wherein said stored first snapshot is a most recently stored snapshot of said data item; and
   (h) displaying said all differences stored in step (f) between said second snapshot and said first snapshot, or displaying an indication that said no difference was determined between said second snapshot and said first snapshot, on a graphics display in said remote support node.

2. A computerized method for tracking configuration changes within a computer system according to claim 1 wherein step (b) further comprises step (b1), and step (f) further comprises step (f1):
   (b1) storing said first snapshot and said first time stamp of said data item in a data storehouse within said remote support node; and
   (f1) storing said all differences identified in step (d) and said second time stamp in said data storehouse within said remote support node.

3. A computerized method for tracking configuration changes within a computer system according to claim 1 further comprising the steps of:
   (i) collecting an additional snapshot of said data item having said unique identifier at an additional predetermined time, from said first monitored device on said computer system network, and setting an additional time stamp indicating when said additional snapshot was collected;
   (j) comparing said additional snapshot of said data item to said most recently stored snapshot of said data item;
   (k) repeating steps (e), (f), (g), and (h) for said additional snapshot and said most recently stored snapshot of said data item; and
   (l) repeating steps (i), (j), and (k) for a plurality of additional snapshots of said data item having said unique identifier, at a plurality of additional predetermined times, from said first monitored device on said computer system network.

4. A computerized method for tracking configuration changes within a computer system according to claim 3 further comprising the step of:
   (m) repeating steps (a) through (l) for a plurality of data items of said first monitored device on said computer system network, wherein each of said plurality of data items has a different unique identifier.

5. A computerized method for tracking configuration changes within a computer system according to claim 4 further comprising the step of:
   (n) repeating steps (a) through (m) for each of a plurality of additional monitored devices on said computer system network.

6. A computerized method for tracking configuration changes within a computer system according to claim 3 wherein step (a) further comprises step (a0) performed before step (a), step (c) further comprises step (c0) performed before step (c), step (i) further comprises step (i0) performed before step (i), and step (l) further comprises step (l) performed before step (l):
   (a0) setting said first predetermined time for collecting said first snapshot of said data item within schedule software located within said remote support node;
   (c0) setting said second predetermined time for collecting said second snapshot of said data item within said schedule software located within said remote support node;
   (i0) setting said additional predetermined time for collecting said additional snapshot of said data item within said schedule software located within said remote support node; and
   (l0) setting said plurality of additional predetermined times for collecting said plurality of additional snapshots of said data item within said schedule software located within said remote support node.

7. A computerized method for tracking configuration changes within a computer system according to claim 6 wherein step (a0) further comprises the steps of:
   (a0a) invoking said schedule software at said first predetermined time
   (a0b) passing a collection root identifier from said schedule software to pebble software located within said remote support node, wherein said collection root identifier defines a list of data items;
   (a0c) invoking, with said schedule software, a collector portion of said pebble software;
   (a0d) accessing, with said collector portion of said pebble software, a data storehouse within said remote support node, wherein said collection root identifier is used to get said list of data items;
   (a0e) accessing, with said collector portion of said pebble software, said data storehouse within said remote support node, wherein collection method information is gathered for collecting said snapshots of each of said data items in said list of data items from said first monitored device, and from a plurality of additional monitored devices, said collection method information comprising commands for collecting each of said data items in said list, attributes of each of said data items when said attributes are associated with each of said data items in said list, a most recently stored signature of each of said data items in said list, and from which of said first monitored device and said plurality of additional monitored devices each of said data items in said list is to be collected; and (a0f) grouping said collection method information gathered in step (a0e) by said first monitored device and by each of said plurality of additional monitored devices.

8. A computerized method for tracking configuration changes within a computer system according to claim 7 wherein said first monitored device on said computer system network is a first monitored interconnect device.

9. A computerized method for tracking configuration changes within a computer system according to claim 8 wherein step (a) further comprises the steps of:

(a1) invoking, through said collector portion of said pebble software, a collection script for collecting said first snapshot of said data item from said first monitored interconnect device;

(a2) invoking, through said collection script, a first command from said grouped collection method information gathered in step (a0e) and grouped in step (a0f) for said first monitored interconnect device, to collect said first snapshot of said data item from said first monitored interconnect device;

(a3) determining if said first command to collect said first snapshot of said data item was successfully executed;

(a4) when step (a3) determines that said first command was successfully executed, performing steps (a5) through (a9) and not steps (a10) through (a12), and when step (a3) determines that said first command was not successfully executed, performing steps (a10) through (a12) and not steps (a5) through (a9);

(a5) creating a first signature for said data item;

(a6) capturing a first output from said executed first command, any first attributes, said first signature, and said first time stamp;

(a7) returning said captured first output, said captured any first attributes, said captured first signature, and said captured first time stamp to said remote support node for storing in a memory within said remote support node;

(a8) transferring, from said memory within said remote support node, said stored first output, said stored any first attributes, and said stored first time stamp for storage in a revision control system in said data storehouse within said remote support node, wherein said stored first output, said stored any first attributes, and said stored first time stamp constitute said first snapshot;

(a9) transferring, from said memory within said remote support node, said stored first signature, said stored first time stamp, and a first change event indicator for storage in a data base in said data storehouse within said remote support node;

(a10) generating a first error message, and capturing said first error message and said first time stamp;

(a11) returning said captured first error message and said captured first time stamp to said remote support node; and (a12) storing said captured first error message and said captured first time stamp in a log file in a data base in said data storehouse within said remote support node.

10. A computerized method for tracking configuration changes within a computer system according to claim 8 wherein step (c) further comprises the steps of:

(c1) invoking, through said collector portion of said pebble software, said collection script for collecting said second snapshot of said data item from said first monitored interconnect device;

(c2) invoking, through said collection script, a first command from said grouped collection method information gathered in step (a0e) and grouped in step (a0f) for said first monitored interconnect device, to collect said second snapshot of said data item from said first monitored interconnect device;

(c3) determining if said first command to collect said second snapshot of said data item was successfully executed;

(c4) when step (c3) determines that said first command was successfully executed, performing steps (c5) through (c12) and not steps (c13) through (c15), and when step (c3) determines that said first command was not successfully executed, performing steps (c13) through (c15) and not steps (c5) through (c12);

(c5) creating a second signature for said data item;

(c6) capturing a second output from said executed first command, any second attributes, said second signature, and said second time stamp;

(c7) returning said captured second output, said captured any second attributes, said captured second signature, and said captured second time stamp to said remote support node for storing in a memory within said remote support node;

(c8) comparing, within said remote support node, said second signature of said data item with said most recently stored signature of said data item from step (a0e);

(c9) when step (c8) determines that said second signature is different from said most recently stored signature of said data item, performing steps (c10) and (c11) and not step (c12), and when step (c10) determines that said second signature is not different, performing step (c12) and not steps (c10) and (c11);

(c10) transferring, from said memory within said remote support node, said stored second output, said stored any second attributes, and said stored first time stamp for storage in a revision control system in said data storehouse within said remote support node, wherein said stored second output, said stored any second attributes, and said stored second time stamp constitute said second snapshot;

(c11) transferring, from said memory within said remote support node, said stored second signature, said stored second time stamp, and a second change event indicator for storage in a data base in said data storehouse within said remote support node;

(c12) discarding said captured second output, said captured any second attributes, said captured second signature, and said captured second time stamp;

(c13) generating a second error message, and capturing said second error message and said second time stamp;

(c14) returning said captured second error message and said captured second time stamp to said remote support node; and (c15) storing said captured second error message and said captured second time stamp in a log file in a data base in said data storehouse within said remote support node.

11. A computerized method for tracking configuration changes within a computer system according to claim 8 wherein step (i) further comprises the steps of:

(i1) invoking, through said collector portion of said pebble software, said collection script for collecting said second additional snapshot of said data item from said first monitored interconnect device;

(i2) invoking, through said collection script, a first command from said grouped collection method information gathered in step (a0e) and grouped in step (a0f) for said first monitored interconnect device, to collect said additional snapshot of said data item from said first monitored interconnect device;

(i3) determining if said first command to collect said additional snapshot of said data item was successfully executed;

(i4) when step (i3) determines that said first command was successfully executed, performing steps (i5) through (i12) and not steps (i13) through (i15), and when step (i3) determines that said first command was not successfully executed, performing steps (i13) through (i15) and not steps (i5) through (i12);

(i5) creating an additional signature for said data item;

(i6) capturing an additional output from said executed first command, any additional attributes, said additional signature, and said additional time stamp;

(i7) returning said captured additional output, said captured any additional attributes, said captured additional signature, and said captured additional time stamp to said remote support node for storing in a memory within said remote support node;

(i8) comparing, within said remote support node, said additional signature of said data item with said most recently stored signature of said data item from step (a0e);

(i9) when step (i8) determines that said additional signature is different from said most recently stored signature of said data item, performing steps (i10) and (i11) and not step (i12), and when step (i10) determines that said additional signature is not different, performing step (i12) and not steps (i10) and (i11);

(i10) transferring, from said memory within said remote support node, said stored additional output, said stored any additional attributes, and said stored additional time stamp for storage in a revision control system in said data storehouse within said remote support node, wherein said stored additional output, said stored any additional attributes, and said stored additional time stamp constitute said additional snapshot;

(i11) transferring, from said memory within said remote support node, said stored additional signature, said stored additional time stamp, and an additional change event indicator for storage in a data base in said data storehouse within said remote support node;

(i12) discarding said captured additional output, said captured any additional attributes, said captured additional signature, and said captured additional time stamp;

(i13) generating an additional error message, and capturing said additional error message and said additional time stamp;

(i14) returning said captured additional error message and said captured additional time stamp to said remote support node; and (i15) storing said additional error message and said additional time stamp in a log file in a data base in said data storehouse within said remote support node.

12. A computerized method for tracking configuration changes within a computer system according to claim 11 wherein step (l) further comprises the steps of:

(l1) repeating steps (i1) through (i15) for each of said plurality of additional snapshots at each of said plurality of additional predetermined times.

13. A computerized method for tracking configuration changes within a computer system according to claim 7 wherein said first monitored device on said computer system network is a first monitored computer.

14. A computerized method for tracking configuration changes within a computer system according to claim 13 wherein step (a) further comprises the steps of:

(a1) launching, through said collector portion of said pebble software, remote execution of collecting said grouped collection method information for said first monitored computer by passing said grouped collection method information for said first monitored computer to said first monitored computer;

(a2) invoking, through said collector portion of said pebble software, client collection software installed on said first monitored computer to collect said first snapshot of said data item;

(a3) invoking, through said client collection software, a first command from said grouped collection method information passed to said first monitored computer in step (a1) to collect said data item from said first monitored computer;

(a4) determining if said first command to collect said data item was successfully executed;

(a5) when step (a4) determines that said first command was successfully executed, performing steps (a6) through (a10) and not steps (a11) through (a13), and when step (a4) determines that said first command was not successfully executed, performing steps (a11) through (a13), and not steps (a6) through (a10);

(a6) creating a first signature for said data item;

(a7) storing a first output from said executed first command, any first attributes, said first signature, and said first time stamp in a first monitored computer memory;

(a8) returning said stored first output, said stored any first attributes, said stored first signature, and said stored first time stamp, from said first monitored computer memory, to said remote support node for storing in a memory within said remote support node;

(a9) transferring, from said memory in said remote support node, said stored first output, said stored any first attributes, and said stored first time stamp for storage in a revision control system in said data storehouse within said remote support node, wherein said stored first output, said stored any first attributes, and said stored first time stamp constitute said first snapshot;

(a10) transferring, from said memory in said remote support node, said stored first signature, said stored first time stamp, and a first change event indicator for storage in a data base in said data storehouse within said remote support node;

(a11) generating a first error message, and storing said first error message and said first time stamp in a first monitored computer memory;

(a12) returning said stored first error message and said stored first time stamp from said first monitored computer memory to said remote support node; and (a13) storing said stored first error message and said stored first time stamp in a log file in a data base in said data storehouse within said remote support node.

15. A computerized method for tracking configuration changes within a computer system according to claim 13 wherein step (c) further comprises the steps of:

(c1) launching, through said collector portion of said pebble software, remote execution of collecting said grouped collection method information for said first monitored computer by passing said grouped collection method information for said first monitored computer to said first monitored computer;

(c2) invoking, through said collector portion of said pebble software, client collection software installed on said first monitored computer to collect said second snapshot of said data item;

(c3) invoking, through said client collection software, a first command from said grouped collection method information passed to said first monitored computer in step (c1) to collect said data item from said first monitored computer;

(c4) determining if said first command to collect said data item was successfully executed;

(c5) when step (c4) determines that said first command was successfully executed, performing steps (c6) through (c10) and not step (c11), and when step (c4) determines that said first command was not successfully executed, performing step (c11) and not steps (c6) through (c10);

(c6) creating a second signature for said data item;

(c7) comparing said second signature of said data item with said most recently stored signature of said data item from step (a0e);

(c8) when step (c7) determines that said second signature is different from said most recently stored signature of said data item, performing step (c9) and not step (c10), and when step (c7) determines that said second signature is not different, performing step (c10) and not step (c9);

(c9) storing differences from a second output from said executed first command, any second attributes, said second signature, and said second time stamp in a first monitored computer memory;

(c10) discarding a second output from said executed first command, any second attributes, said second signature, and said second time stamp;

(c11) generating a second error message, and storing said second error message and said second time stamp in a first monitored computer memory;

(c12) returning said stored differences from said second output from said executed first command, said stored any second attributes, said stored second signature, and said stored second time stamp, from said first monitored computer memory, to said remote support node for storing in a memory within said remote support node;

(c13) returning said stored second error message and said stored second time stamp, from said first monitored computer memory, to said remote support node for storing in said memory within said remote support node;

(c14) transferring, from said memory in said remote support node, said stored differences from said second output, said stored any second attributes, and said stored second time stamp for storage in a revision control system in said data storehouse within said remote support node, wherein said stored differences from said second output, said stored any second attributes, and said stored second time stamp constitute said second snapshot;

(c15) transferring, from said memory in said remote support node, said stored first signature, said stored second time stamp, and a second change event indicator for storage in a data base in said data storehouse within said remote support node; and (c16) transferring, from said memory in said remote support node, said stored second error message and said stored second time stamp for storage in a log file in said data base in said data storehouse within said remote support node.

16. A computerized method for tracking configuration changes within a computer system according to claim 13 wherein step (i) further comprises the steps of:

(i1) launching, through said collector portion of said pebble software, remote execution of collecting said grouped collection method information for said first monitored computer by passing said grouped collection method information for said first monitored computer to said first monitored computer;

(i2) invoking, through said collector portion of said pebble software, client collection software installed on said first monitored computer to collect said additional snapshot of said data item;

(i3) invoking, through said client collection software, a first command from said grouped collection method information passed to said first monitored computer in step (i1) to collect said data item from said first monitored computer;

(i4) determining if said first command to collect said data item was successfully executed;

(i5) when step (i4) determines that said first command was successfully executed, performing steps (i6) through (i10) and not step (i11), and when step (i4) determines that said first command was not successfully executed, performing step (i11) and not steps (i6) through (i10);

(i6) creating an additional signature for said data item;

(i7) comparing said additional signature of said data item with said most recently stored signature of said data item from step (a0e);

(i8) when step (i7) determines that said second signature is different from said most recently stored signature of said data item, performing step (i9) and not step (i10), and when step (i7) determines that said second signature is not different, performing step (i10) and not step (i9);

(i9) storing differences from an additional output from said executed first command, any additional attributes, said additional signature, and said additional time stamp in a first monitored computer memory;

(i10) discarding, an additional output from said executed first command, any additional attributes, said additional signature, and said additional time stamp;

(i11) generating an additional error message, and storing said additional error message and said additional time stamp in a first monitored computer memory;

(i12) returning said stored differences from an additional output from said executed first command, said stored any additional attributes, said stored additional signature, and said stored additional time stamp, from said first monitored computer memory, to said remote support node for storing in a memory within said remote support node;

(i13) returning said stored additional error message and said stored additional time stamp, from said first monitored computer memory, to said remote support node for storing in said memory within said remote support node;

(i14) transferring, from said memory in said remote support node, said stored differences from said additional output, said stored any additional attributes, and said stored additional time stamp for storage in a revision control system in said data storehouse within said remote support node, wherein said stored differences from said additional output, said stored any additional attributes, and said stored additional time stamp constitute said additional snapshot;

(i15) transferring, from said memory in said remote support node, said stored additional signature, said stored additional time stamp, and an additional change event indicator for storage in a data base in said data storehouse within said remote support node; and (i16) transferring, from said memory in said remote support node, said stored additional error message and said stored additional time stamp for storage in a log file in a data base in said data storehouse within said remote support node.

17. A computerized method for tracking configuration changes within a computer system according to claim 16 wherein step (l) further comprises the steps of:

(l1) repeating steps (i1) through (i16) for each said plurality of additional snapshots at each of said plurality of additional predetermined times.

18. A computerized method for tracking configuration changes within a computer system according to claim 1 wherein step (h) further comprises the steps of:

(h1) loading web browser software on a browser computer, wherein said browser computer is connected to said remote support node through a second network connection;

(h2) requesting, through said web browser software, a universal resource locator for said computerized method for tracking configuration changes;

(h3) establishing a connection between said browser computer and said remote support node through said second network connection;

(h4) finding, within said remote support node, a html page associated with said universal resource locator requested in step (h2) for said computerized method for tracking configuration changes;

(h5) returning said html page for said computerized method for tracking configuration changes to said browser computer through said connection; and (h6) displaying said html page for said computerized method for tracking configuration changes on a screen display on said browser computer wherein said all differences stored in step (f) are displayed within said html page on said screen display.

19. A computerized method for tracking configuration changes within a computer system according to claim 18 wherein step (h6) further comprises the steps of:

(h6a) displaying said html page on said screen display as a tracking tree frame and a data display frame;

(h6b) receiving click input on a hyperlink in said html page;

(h6c) requesting a universal resource locator for said hyperlink in said html page through said web browser software and said connection to said remote support node;

(h6d) finding, within said remote support node, a html page for said hyperlink requested in step (h6c);

(h6e) returning said html page for said hyperlink to said browser computer through said connection; and (h6f) displaying said html page for said hyperlink in said data display frame in said screen display.

20. A computerized method for tracking configuration changes within a computer system according to claim 19 wherein step (h6a) further comprises the steps of:

(h6a1) displaying in said tracking tree frame at least one tab, wherein receiving click input on said at least one tab accesses a function of said computerized method for tracking configuration changes; and (h6a2) displaying within each of said at least one tab at least one available action button, wherein receiving click input on said at least one available action button will execute a specific action within said function of said computerized method for tracking configuration changes.

21. A computerized method for tracking configuration changes within a computer system according to claim 20 wherein step (h6a1) further comprises the steps of:

(h6a1a) receiving click input on said at least one tab, wherein said function accessed is a tracking function;

(h6a1b) displaying in said tracking tree frame as part of said tracking function a tracking tree, wherein said tracking tree is a an expandable index of said data items;

(h6a1c) receiving click input on a data item name in said tracking tree which has a change indicator associated with a data item icon corresponding to said data item name; and (h6a1d) displaying in said data display frame a time frame, a changes within time frame, and a collection history, wherein said time frame shows a first collection time and a second collection time during which said data item was changed, said changes within time frame shows said at least one difference of said data item that occurred between said first collection time and said second collection time, and said collection history shows a date and a time that said data item was changed.

22. A computerized method for tracking configuration changes within a computer system according to claim 20 wherein step (h6a2) further comprises the steps of:

(h6a2a) receiving click input on said at least one available action button wherein said at least one available action button is a change time frame available action button;

(h6a2b) entering a new first collection time and a new second collection time;

(h6a2c) requesting a script associated with said change time frame available action button through said web browser software and said connection to said remote support node;

(h6a2d) loading said script requested in step (h6a2c) within pebble software within said remote support node;

(h6a2e) communicating with hat daemon software to get permission to run said script;

(h6a2f) running said script and accessing a data storehouse within said remote support node to obtain said at least one difference of said data item;

(h6a2g) formatting said at least one difference of said data item into a html formatted page;

(h6a2h) returning said html formatted page for said at least one difference of said data item to said browser computer through said connection; and (h6a2i) displaying said html formatted page for said at least one difference of said data item in said data display frame in said screen display.

* * * * *

UNITED STATES PATENT AND TRADEMARK OFFICE
CERTIFICATE OF CORRECTION

PATENT NO. : 6,282,175 B1
DATED : August 28, 2001
INVENTOR(S) : Steele et al.

It is certified that error appears in the above-identified patent and that said Letters Patent is hereby corrected as shown below:

<u>Column 8,</u>
Line 28, delete "(GUIDs," and insert therefor -- (GUIDs) --

<u>Column 12,</u>
Line 21, before "performed" delete "(1)" and insert therefor -- (10) --

<u>Column 14,</u>
Line 57, after "node; and" begin a new paragraph

Signed and Sealed this

Seventh Day of October, 2003

JAMES E. ROGAN
*Director of the United States Patent and Trademark Office*